US008992028B2

(12) United States Patent
Hudman

(10) Patent No.: US 8,992,028 B2
(45) Date of Patent: Mar. 31, 2015

(54) FREE FORM OPTICAL REDIRECTION APPARATUS AND DEVICES USING SAME

(75) Inventor: Joshua M. Hudman, Issaquah, WA (US)

(73) Assignee: Microvision, Inc., Redmond, WA (US)

( * ) Notice: Subject to any disclaimer, the term of this patent is extended or adjusted under 35 U.S.C. 154(b) by 823 days.

(21) Appl. No.: 13/087,276

(22) Filed: Apr. 14, 2011

(65) Prior Publication Data
US 2012/0262680 A1 Oct. 18, 2012

(51) Int. Cl.
G03B 21/28 (2006.01)
H04N 9/31 (2006.01)
G02B 3/00 (2006.01)
G02B 26/10 (2006.01)
G02B 27/00 (2006.01)

(52) U.S. Cl.
CPC .......... H04N 9/3173 (2013.01); H04N 9/3129 (2013.01); H04N 9/3185 (2013.01); G02B 3/0081 (2013.01); G02B 26/101 (2013.01); G02B 27/0031 (2013.01)
USPC ........................................ 353/98; 359/196.1

(58) Field of Classification Search
CPC .......... H04N 5/74; G03B 21/26; G03B 21/14; G03B 27/00
USPC ............. 353/98, 101, 99; 205/208; 359/196.1
See application file for complete search history.

(56) References Cited

U.S. PATENT DOCUMENTS

| 5,737,112 | A * | 4/1998 | Iizuka | 359/205.1 |
| 7,450,285 | B2 * | 11/2008 | Fujiyo et al. | 359/207.1 |
| 2001/0050797 | A1 * | 12/2001 | Toyoda et al. | 359/205 |
| 2002/0044264 | A1 * | 4/2002 | Lu | 353/101 |
| 2004/0080799 | A1 * | 4/2004 | Ishihara | 359/202 |
| 2008/0143979 | A1 * | 6/2008 | Konno | 353/98 |
| 2008/0158524 | A1 | 7/2008 | Konno et al. | |
| 2009/0128784 | A1 | 5/2009 | Yoon | |
| 2010/0060863 | A1 | 3/2010 | Hudman et al. | |
| 2010/0302464 | A1 | 12/2010 | Raring et al. | |
| 2010/0321750 | A1 | 12/2010 | Burinskiy et al. | |

FOREIGN PATENT DOCUMENTS

EP 2105791 9/2009
JP 2001-281583 10/2001

(Continued)

OTHER PUBLICATIONS

"Supplementary European Search Report", Feb. 25, 2014.

(Continued)

Primary Examiner — William C Dowling
Assistant Examiner — Jerry Brooks
(74) Attorney, Agent, or Firm — Kevin D. Wills

(57) ABSTRACT

A projection system (900) includes a scanner (802) and light source (801). The scanner (802) is configured to crate a scan cone (994) for forming images (995). A principal beam (992) defines a traveling direction of the scan cone (994). An optical device (880) having decentered, free-form major faces is disposed at an output of the projection system (900) such that the scan cone (994) passes through the optical device (880). The optical device (880) is configured to redirect the principal beam (992), and accordingly the traveling direction of the scan cone (994), by a predetermined amount and to correct both anamorphic distortion and vertical smile distortion initially present in the image.

9 Claims, 11 Drawing Sheets

(56) References Cited

FOREIGN PATENT DOCUMENTS

| JP | 2004-138719 | 5/2004 |
|---|---|---|
| JP | 2008151887 | 7/2008 |

OTHER PUBLICATIONS

Wyant, James C., "Basic Wavefront Abberation Theory for Optical Metrology", *Applied Optics and Optical Engineering*, vol. XI Jan. 1, 1992, 1-53.

* cited by examiner

US 8,992,028 B2

FREE FORM OPTICAL REDIRECTION APPARATUS AND DEVICES USING SAME

BACKGROUND

1. Technical Field

This invention relates generally to optical devices, and more particularly to optical redirection devices suitable for distortion correction use in infinite focus projection systems.

2. Background Art

Scanned laser projection devices facilitate the production of brilliant images created with vibrant colors. Scanned systems, such as those manufactured by Microvision, Inc., are capable of creating bright, sharp images with a large depth of focus. The depth of focus, which is frequently tens of meters long, is referred to as "infinite focus" because it allows the projector to focus at such a wide range of distances that it approximates an infinite depth when compared to the area of a single pixel or image element. These scanned laser projection systems can be designed with compact form factors at a reasonable cost. These systems consume small amounts of power yet deliver vivid, complex images.

One challenge associated with these systems is size reduction. It can be desirable to make the systems smaller, so that the projection systems can be used in compact applications, such as handheld presentations. However, as the optical components become smaller, issues can arise. Distortion of images can be introduced. Similarly, optical artifacts can become a problem.

It would be advantageous to have a compact projection system that does not distort projected images.

Figure 1:
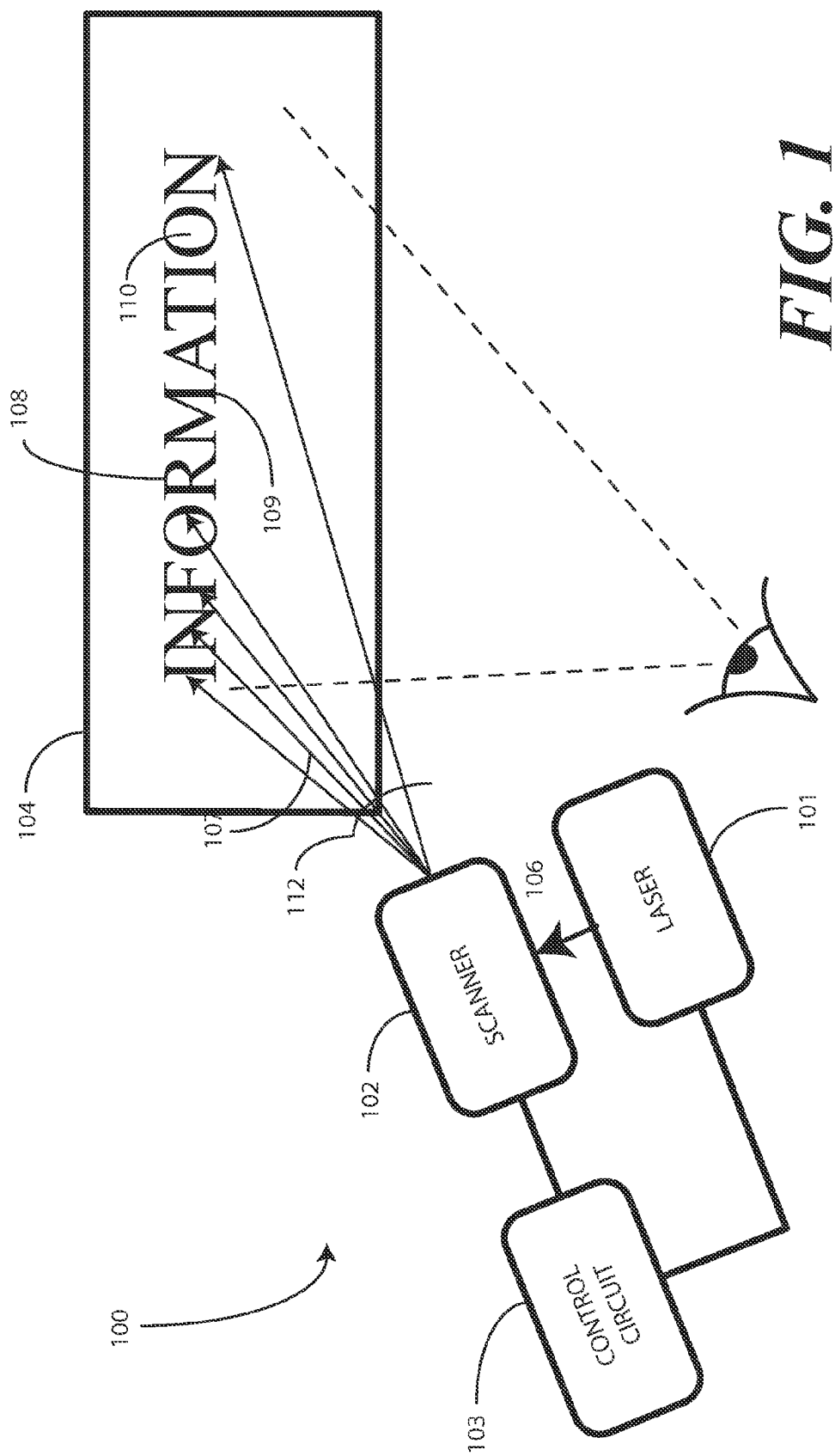
FIG. 1 illustrates one embodiment of an infinite focus projection system configured to present information to a user.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF EMBODIMENTS OF THE INVENTION

Before describing in detail embodiments that are in accordance with the present invention, it should be observed that the embodiments reside primarily in combinations of method steps and apparatus components related to an optical redirection device and an associated imaging system, and applications thereof. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

It will be appreciated that embodiments of the invention described herein may be comprised of one or more conventional processors and unique stored program instructions that control the one or more processors to implement, in conjunction with certain non-processor circuits, some, most, or all of the functions of the systems and applications set forth below. The non-processor circuits may include, but are not limited to, microprocessors, scanning mirrors, image spatial modulation devices, memory devices, clock circuits, power circuits, and so forth. As such, the functions and operative states shown herein may be interpreted as steps of a method. Alternatively, some or all functions employed by the one or more processors to control the various elements herein, including the spatial light modulator, beam translator, and light translation element, could be implemented by a state machine that has no stored program instructions, or in one or more application specific integrated circuits, in which each function or some combinations of certain of the functions are implemented as custom logic. Of course, a combination of the two approaches could be used. It is expected that one of ordinary skill, notwithstanding possibly significant effort and many design choices motivated by, for example, available time, current technology, and economic considerations, when guided by the concepts and principles disclosed herein will be readily capable of generating such programs and circuits with minimal experimentation.

Embodiments of the invention are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

FIG. 1 illustrates one embodiment of a projection system 100 having infinite focus. As used herein, "infinite focus" refers generally to a projection system capable of focusing an image across distances greater than ten meters. For example, where the projection system 100 comprises a Microelectromechanical System (MEMS) system such as the PicoP™ laser-based system manufactured by Microvision, Inc., the projection system 100 scans light from laser sources with a mirror. Such a system has been shown to be readily able to remain in focus over a wide range of distances. The distances span tens of meters. Such systems are referred to as "infinite focus" systems because the distance across which they can focus is significantly larger than a pixel or image element, or even the image itself. Therefore, the projection system 100 generally does not require any focusing adjustment means, either automatic or manual, to focus at least one image 108 on a projection surface 104. The image 108 is inherently focused when projected on the projection surface 104 independent of the distance between the projection system 100 and the projection surface 104. Additionally, the projection system 100 in one embodiment is capable of changing shape and intensity so as to be projected on any of a variety of projection surfaces quickly or even simultaneously.

As shown in FIG. 1, the projection system 100 includes a laser projection source 101, a scanner 102, a control circuit 103, and a projection surface 104. While the laser projection source 101 can be a simple monocolor laser, it can alternatively comprise multiple lasers or an integrated multicolor laser device. In one embodiment, the laser projection source 101 includes a red laser, a blue laser, and a green laser. These lasers can be of various types. For example, for compact designs, semiconductor-based lasers can be used, including edge emitting lasers or vertical cavity surface emitting lasers. In other applications, larger, more powerful lasers can be used, alone or in combination.

Where multiple lasers are used as the laser projection source 101, one or more optical alignment devices (not shown in FIG. 1) may be used to orient the plurality of light beams into a single combined light beam. The alignment devices can further blend the output of each laser to form a coherent, multicolored beam of light. In one embodiment, dichroic mirrors can be used to orient the light beams into the combined light beam. Dichroic mirrors are partially reflective mirrors that include dichroic filters that selectively pass light in a narrow bandwidth while reflecting others.

The scanner 102 then delivers scanned light 107 to the projection surface 104 as a projected image 108. The projection surface 104 can take many forms, including a traditional projection surface, a microlens array, numerical aperture expander or other surface configured to receive images from the scanner 102. A control circuit 103, which may be a microprocessor or other programmable device, executes embedded instructions to control the scanner 102, and optionally the laser projection source 101 as well. For example, in one embodiment the control circuit 103 is programmed to control the scanning of the light 106 received from the laser projection source 101 to form the projected image 108.

Figure 2:
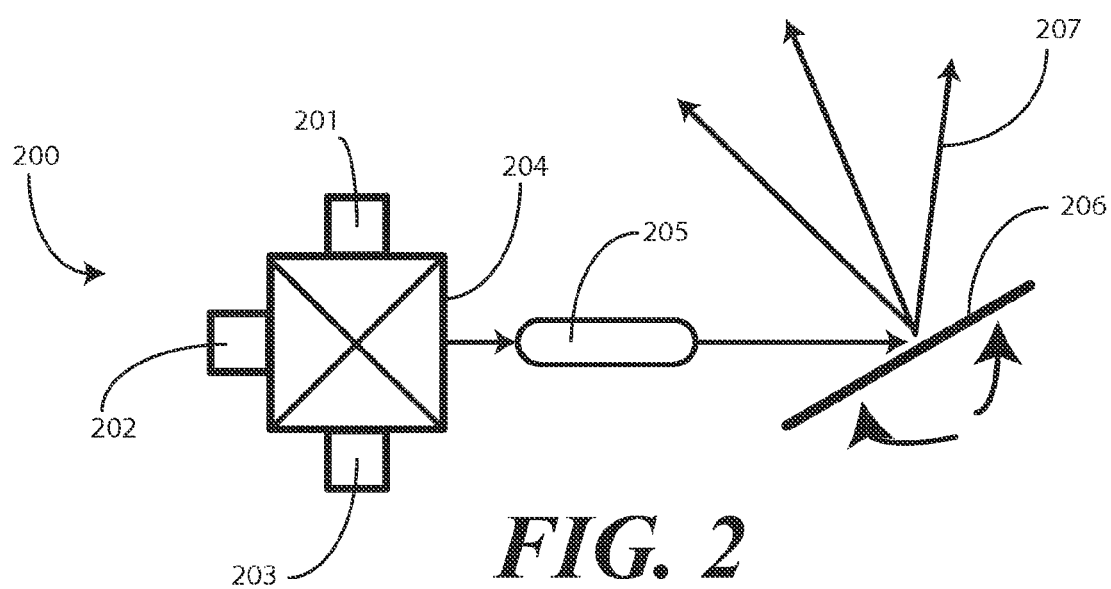
FIG. 2 illustrates one embodiment of a scanning engine in accordance with embodiments of the invention.

Turning now to FIG. 2, illustrated therein are some of the components used in one embodiment of a scanned laser projection source suitable for use with embodiments of the invention. In the illustrative embodiment of FIG. 2, the system uses a MEMS scanned laser source 200. Examples of MEMS scanning light sources, such as those suitable for use with embodiments of the present invention, are set forth in US Pub. Pat. Appln. No. 2007/0159673, entitled, "Substrate-guided Display with Improved Image Quality," which is incorporated by reference herein.

In FIG. 2, the MEMS scanned light source 200 employs three light sources 201,202,203. A beam combiner 204, which may employ dichroic mirrors, combines the output of light sources 201,202,203 to produce a combined modulated beam. A variable collimation or variable focusing optical element 205 produces a variably shaped beam that is scanned by the MEMS scanning mirror 206 as variably shaped scanned light beam 207. Examples of MEMS scanning mirrors, such as those suitable for use with embodiments of the present invention, are set forth in commonly assigned, copending U.S. patent application Ser. No. 11/775,511, filed Jul. 10, 2007, entitled "Substrate-Guided Relays for Use with Scanned Beam Light Sources," which is incorporated herein by reference, and in US Pub. Pat. Appln. No. 2007/0159673, referenced above. The scanned light beam 807 can then be directed to the buried numerical aperture expander (105).

Figure 3:
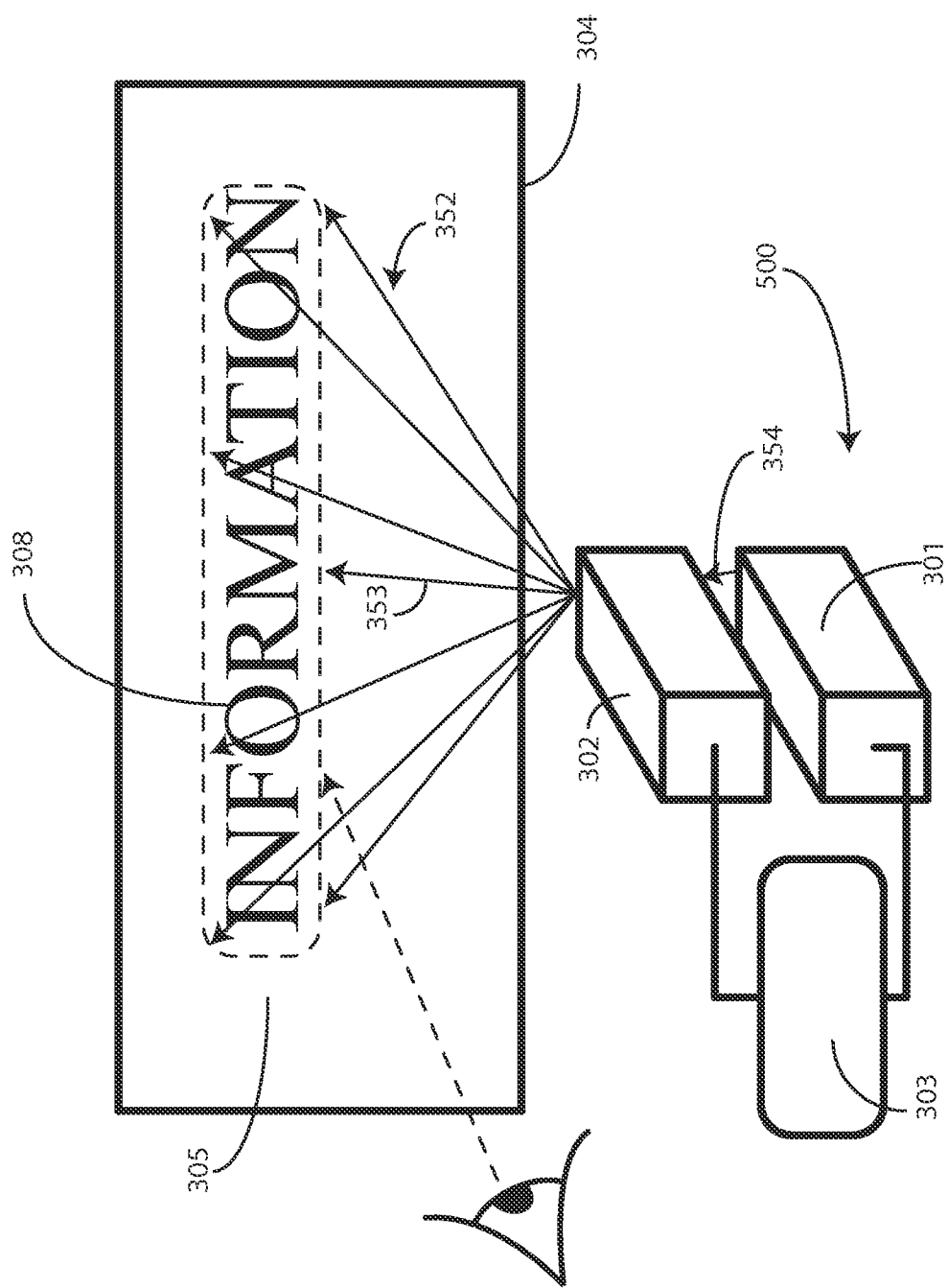
FIG. 3 illustrates a scanned laser projection system configured with vertical beam delivery.

Turning to FIG. 3, illustrated therein is a more detailed view of another MEMS scanned laser engine 300. A control circuit 303 controls a MEMS scanner 302 and, optionally, the laser projection source 301. In this illustrative embodiment, the MEMS scanner 302 is configured to sweep the projection surface 304 in a raster pattern. A feed beam 354 is delivered to the surface of the MEMS scanner 302 at an angle of incidence defined by the physical geometry of the various components and by the need to not obstruct the scanned beam. The scanning action of a reflective surface disposed on the MEMS scanner 302 redirects the light in a sweep pattern to present information 308 on the projection surface 304.

In projection systems such as that shown in FIG. 3, so long as the angle of incidence defined between the laser projection source 301 and the scanner 302 is small, the system works well and delivers distortion free images 308. However, experimental testing has shown that, in some cases, the overall size of the scanning engine can be reduced if the angle of incidence is increased. Testing has shown that when the angle of incidence increases beyond a design threshold, which can be about fourteen or fifteen degrees, noticeable distortion is introduced. The distortion is a result of the large angle of incidence.

For example, FIG. 3 illustrates a system where the angle of incidence is below the design threshold. In this illustrative embodiment, the design threshold is about fourteen or fifteen degrees. Accordingly, the angle of incidence may be nine or ten or eleven degrees. The sweeping action of the reflective surface creates the scan cone 352. A substantially center beam of the scan cone 352 is referred to as the "principal beam" 353. The principal beam 353 generally defines a pointing direction of the scan cone 352, and represents the direction of a feed beam reflected from the scanner 302 when the scan mirror is at its central rest position. The principal beam 353 also indicates the direction that the scan cone 352 propagates. Since the angle of incidence is below the design threshold, the image 308 appears normal and is further is free from distortion.

Figure 4:
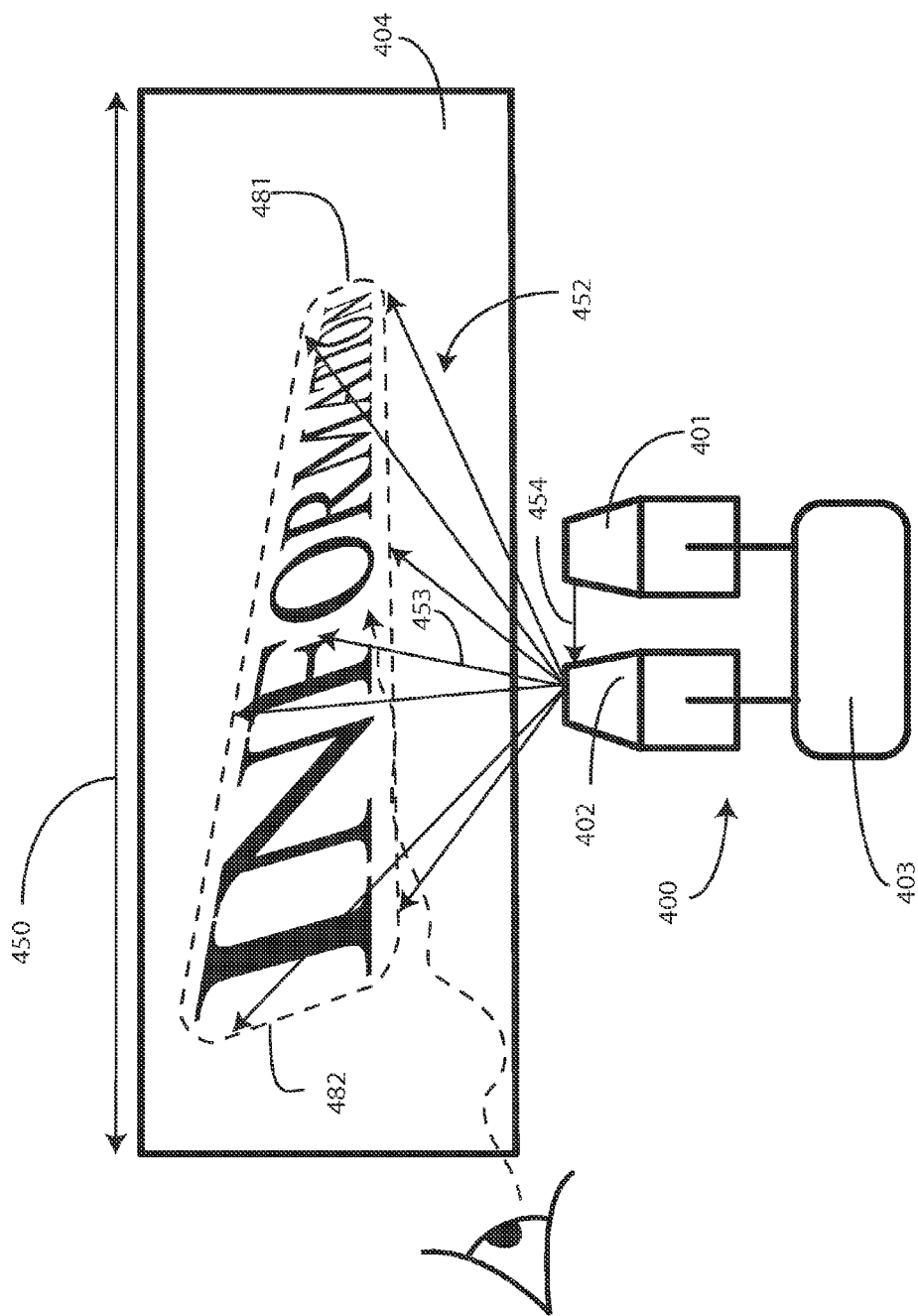
FIG. 4 illustrates a scanned laser projection system configured with horizontal beam delivery in accordance with one or more embodiments of the invention, which is used to reduce the form factor of the scanned laser projection system.

By contrast, FIG. 4 illustrates a scanning engine 400 where the angle of incidence is above the design threshold. In this illustrative embodiment, the angle of incidence is about twenty-seven or twenty-eight degrees, far more than the threshold of fourteen to fifteen degrees mentioned above. This large angle of incidence introduces asymmetry in the scan cone 452, which results in the projected image having what is known as "keystone distortion." Keystone distortion occurs when the image appears to have a first side 481 that is "pinched" relative to the other side 482 due to the scan cone 452 being "tilted" about the principal beam 453. The result is an apparent image shape resembling a keystone of an arch.

In FIG. 4, as in FIG. 3, a MEMS scanning engine 400 includes a control circuit 403, a laser source 401 and a MEMS scanner 402. The laser source 401 and MEMS scanner 402 are aligned such that the feed beam 454 is delivered to the MEMS scanner 402 at an angle of incidence that is above the design threshold, which in this illustrative example, is fifteen degrees. While the principal beam 453 still defines the general pointing direction, the scan cone 452 disposed about the principal beam 453 is distorted because planar surfaces are effectively being projected on a "tilted" plane due to high angle of incidence scanner feed. This creates a "tilted scan object plane" relative to the principal beam 453, which appears as keystone distortion.

One may also note that the scanning engine 400 of FIG. 4 is oriented horizontally, while the scanning engine (300) of FIG. 3 was oriented vertically. The scanning engine 400 of FIG. 4 is shown as a horizontally fed system because experimental testing has shown that configuring MEMS scanners horizontally relative to the laser projection source allows the scanning engine to be manufactured in a more compact form factor. More compact form factors lend themselves better in many applications. However, horizontal alignment frequently requires an angle of incidence that is substantially greater than the design threshold. This need arises because typically the horizontal dimension of a projected image is greater than the vertical dimension and, since the feed beam angle of incidence must be great enough to avoid obstructing the scanned image, a greater feed beam angle of incidence can be required when the feed beam is configured along the horizontal axis. Consequently, horizontally aligned systems frequently suffer from keystone distortion. It should be noted, however, that vertically aligned systems can also suffer from keystone distortion if the angle of incidence is beyond the design threshold. Embodiments of the present invention provide a solution to the keystone distortion introduced in high angle of incidence systems, regardless of alignment.

In a system where the projector components can be moved relative to the projection surface 404, keystone distortion is not difficult to correct. For instance, a simple rotation of the entire projection system will cause the first side 481 of the information to expand and the second side 482 of the information to contract. This is shown generally in FIG. 5 with the MEMS scanning engine 400 being rotated slightly relative to the projection surface 404. In practice this rotation is done within a housing of the projection system so that the user can align a major face with the projection surface rather than having the projection system in a caddy-corner configuration. While correcting keystone distortion, the rotation of the projection system, which can be by an amount on the order of twelve to fifteen degrees in MEMS scanning systems, means that the image 508 is no longer straight in front of the MEMS scanner 402. Instead, it is aligned off-axis by the rotation amount. This is known as "off-axis" projection.

Figure 5:
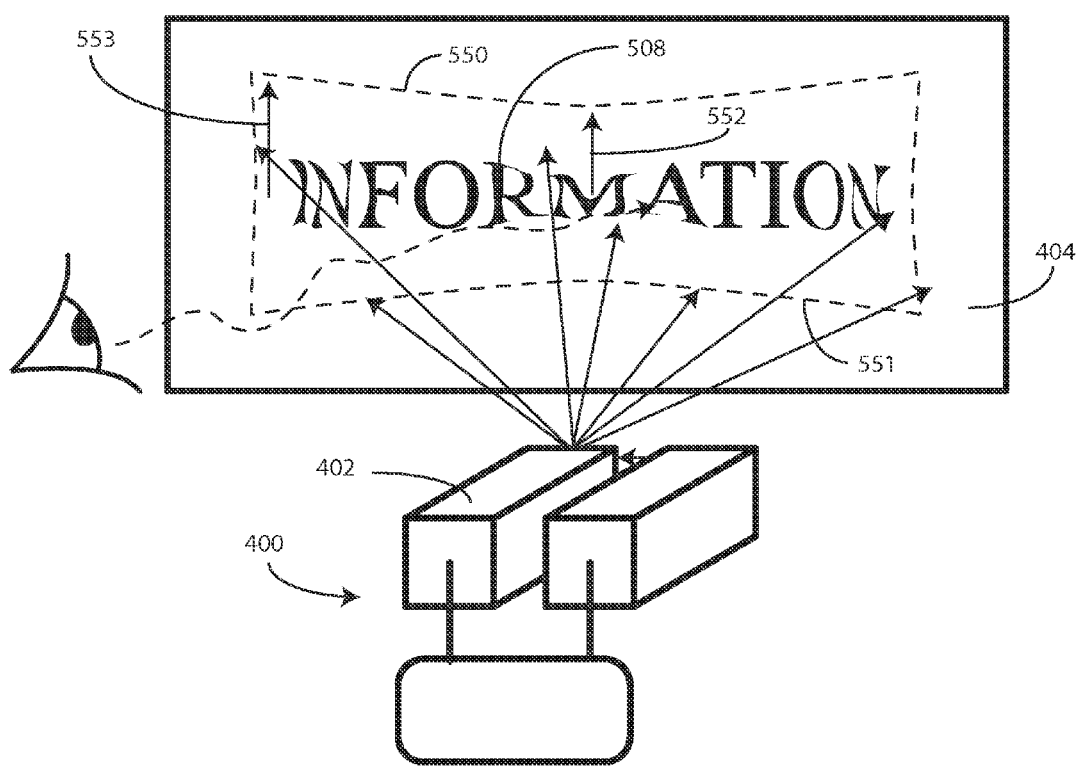
FIG. 5 illustrates vertical smile distortion associated with horizontally fed scanning projection systems.
Figure 6:
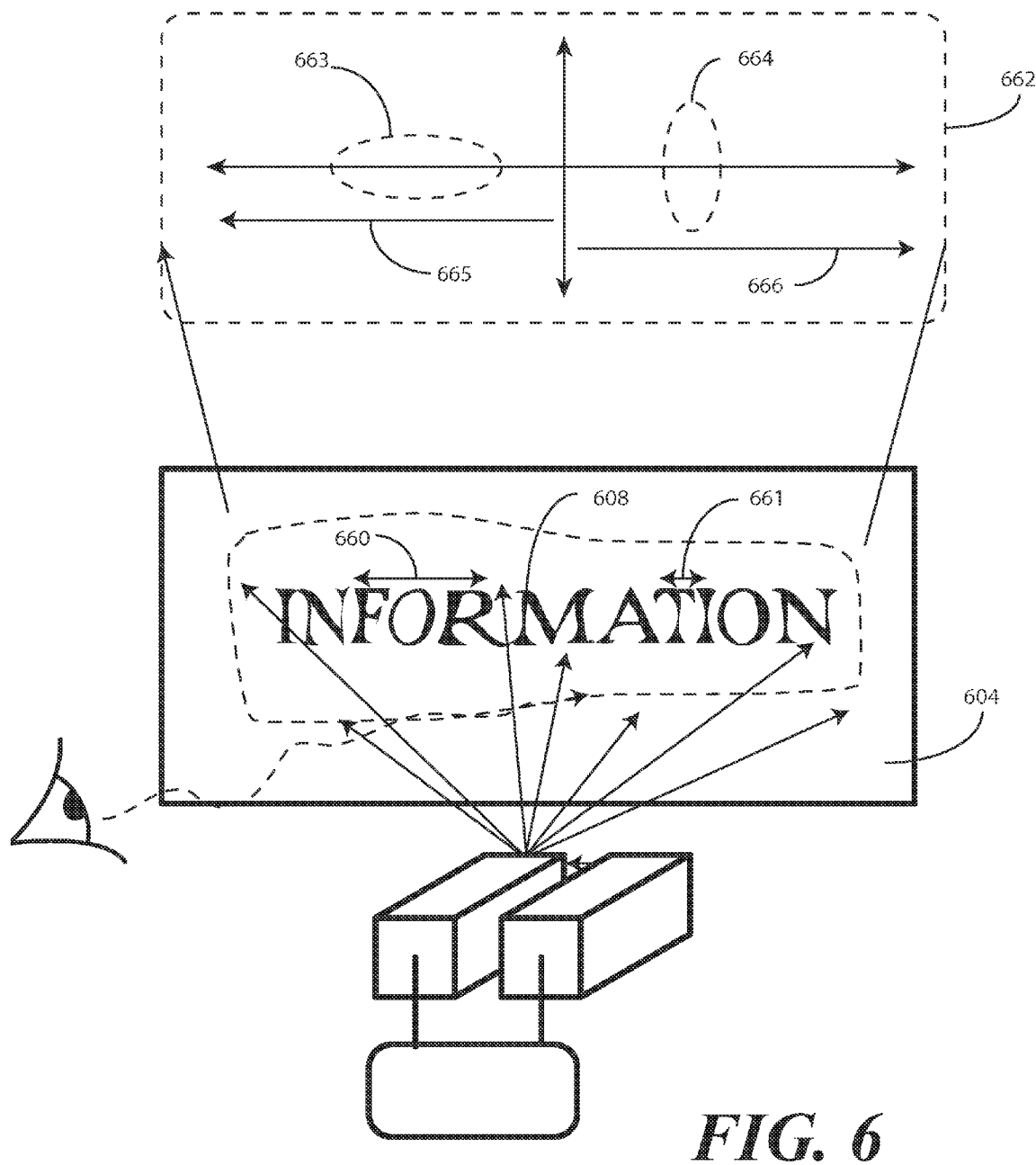
FIG. 6 illustrates anamorphic distortion associated with horizontally fed scanning projection systems.

There are still distortion characteristics that plague such a horizontally fed, off-axis projection system, despite the rotation correction for keystone distortion. The first, shown in FIG. 5, is known as "vertical smile" distortion. The second, shown in FIG. 6, is known as "anamorphic" distortion. Each will now be explained in detail.

Turning again to FIG. 5, as illustrated therein the image 508 suffers from vertical smile distortion. Vertical smile distortion is found in scanning systems and is a result of the mirror scanning beams along the projection surface. When vertical smile distortion occurs, the top side 550 of the image 508 sags because the center height 552 is less than the exterior height 553, while each should be equal. The percentage of vertical smile distortion is represented as the exterior height 553 less the center height 552, divided by the center height 552.

Turning now to FIG. 6, an image 608 suffering from "anamorphic" distortion is shown. For illustration, the image 608 is shown on the projection surface 604 with a plot 662 of the image data shown above the image 608. Reference will be made to both Anamorphic distortion occurs where stretching 660 and compression 661 of portions of the image 608 differ between the horizontal and vertical directions. Recall from the discussion above that projection systems can be rotated to correct for keystone distortion. When this is done, anamorphic distortion can be introduced into the image 608.

For instance, in the illustrative embodiment of FIG. 6 pixel set 663 is compressed while pixel set 664 is stretched. The percent distortion is represented by the following equation set:

$$Wp=(\text{length } 665+\text{length } 666)/2 \qquad \text{(Equation 1)}$$

$$\% \text{ Distortion Left}=((\text{length } 665-Wp)/Wp)*100 \qquad \text{(Equation 2)}$$

$$\% \text{ Distortion Right}=((\text{length } 666-Wp)/Wp*100 \qquad \text{(Equation 3)}$$

Projection systems configured in accordance with embodiments of the present invention employ an optical device that is configured to substantially correct both vertical smile and anamorphic distortion. The term "substantially" means a correction that is sufficient to render vertical smile and anamorphic distortion unnoticeable to an ordinary viewer. By using optical devices configured in accordance with one or more embodiments of the invention, vertical smile and anamorphic distortion can be corrected without introducing additional keystone distortion to the image 608.

Figure 7:
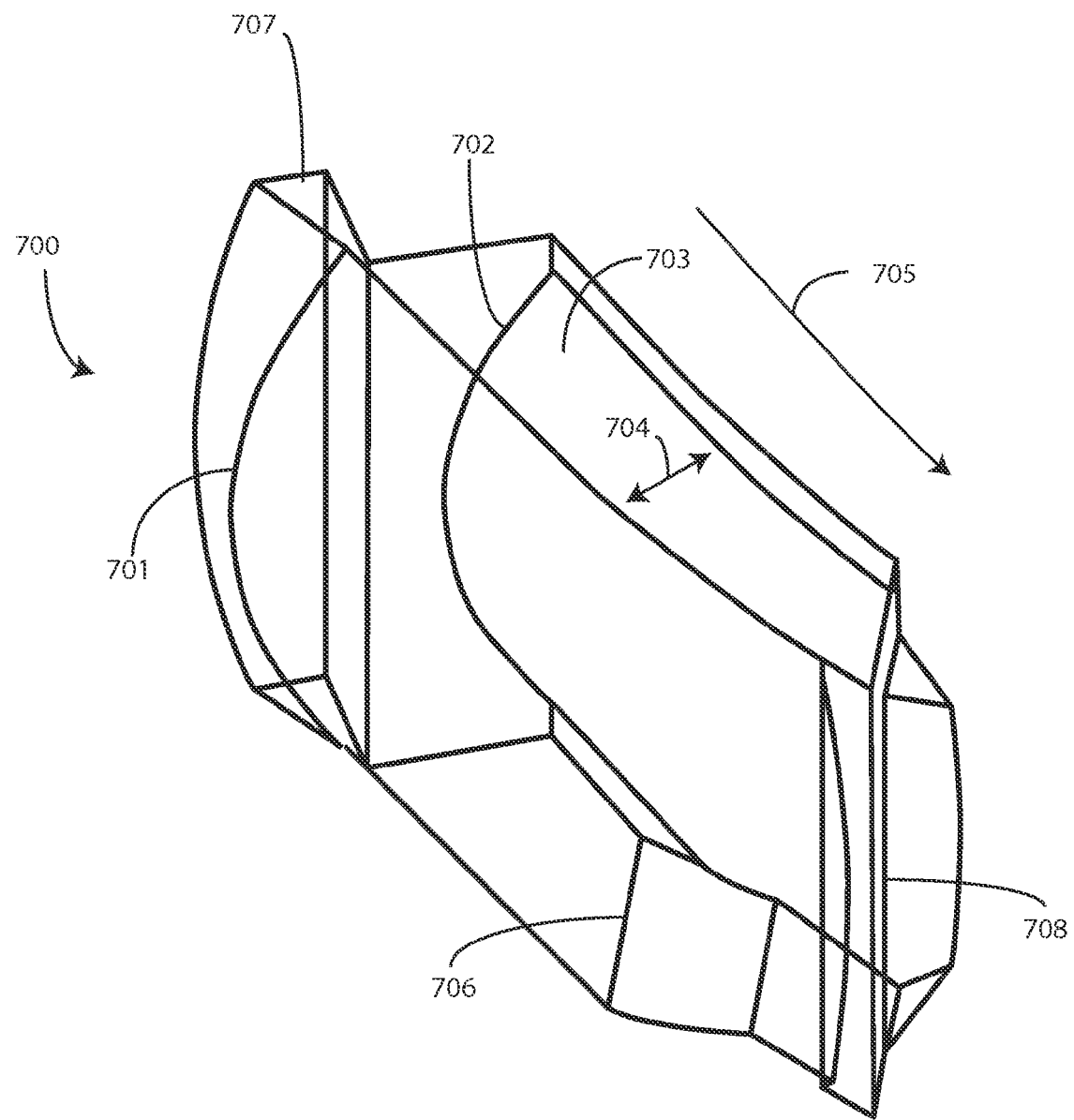
FIG. 7 illustrates one embodiment of an optical device configured to reduce or eliminate vertical smile and anamorphic distortion in horizontally fed scanning projection systems in accordance with one or more embodiments of the invention.

Turning now to FIG. 7, illustrated therein is one embodiment of an optical device 700 suitable for use with infinite focus projection systems. In one embodiment, the optical device 700 employs two different, decentered, refractive, "free-form" optical surfaces, referred to herein as major faces 701,702, to correct vertical smile and anamorphic distortion. In the illustrative embodiment of FIG. 7, major face 701 is convex while major face 702 is concave. Also, in this illustrative embodiment the major faces 701,702 are decentered relative to each other.

The term "free-form" is used to describe major faces 701, 702 that are each defined by a polynomial that is a function of two independent, transverse coordinate variables. Said differently, functions defining the contours of the major faces 701, 702 can be expressed as functions of two Cartesian variables, but are not capable of being expressed as a function of a single radial variable. Accordingly, free-form surfaces will have neither rotational nor radial symmetry. By contrast, typical lens is spherical or aspherical, and is therefore rotationally symmetric. Embodiments of the present invention employ free-form surfaces described by two transverse variables in a polynomial. The degree of the polynomial further defines the free-form surface. Embodiments described herein may employ polynomials of any degree required to substantially correct the vertical smile and anamorphic distortion.

Another feature of the optical device 700, in one embodiment, is that it applies essentially zero power to beams and scan cones passing through the optical device 700. "Essentially zero power" means that any beam expansion applied by the optical device 700 is less than one pixel in any dimension. Said differently, aside from negligible power occurring due to tolerances, no magnification is applied to beams passing through the optical device 700. By using a free-form surfaces with essentially zero power, e.g., major faces 701,702, and then decentering those free-form surfaces relative to each other with an optical material 703 having a decreasing thickness 704 along at least one dimension 705 separating the free-form surfaces, experimental testing has shown that very high distortion correction and pointing correction can be obtained without significantly affecting either resolution or the infinite focus properties of the projection system. Additionally, testing has shown that very little color aberration occurs when beams or a scan cone pass through the optical device 700. Further, when the optical device 700 is essentially zero power, it can be manufactured with relatively relaxed tolerances.

In one or more embodiments, an optical device 700 suitable for use with scanned beam image creation includes one or more of the following properties: essentially no optical power; light beams passing through the optical device 700 are redirected in accordance with the contours of the free-form surfaces and the varied thickness 704 of the optical material 703 disposed between the free-form surfaces; the optical device 700 is optically transmissive; the major faces 701,702 are described by free-form functions that are different from each other; and, in some embodiments, the major faces 701, 702 are described by free-form functions that use coefficients that are within a relatively narrow range. When used with an off-axis scanned projection system, light beams forming a scan cone, which are reflected from the scanner, pass through the optical device 700 to form an image that is substantially free of both vertical smile and anamorphic distortion. At the same time, the infinite focus quality inherent with many scanned image systems is preserved. Further, testing has shown that beam expansion introduced by the optical device 700 is less than a pixel in size.

As shown in FIG. 7, the thickness 704 of the optical material 703 disposed between the major faces 701,702 changes slightly across dimension 705 to form a slight wedge. As will be shown in FIG. 10, the thickness 704 of the optical device 700 is configured to change slightly due to the fact that an off-axis scanned beam is being turned as it exits the projector system. The varied thickness 704 thus creates field dependent wedge across the scan cone. In one or more embodiments, the varied thickness 704 changes so slowly along dimension 705 that it does not affect the infinite focus property of the beam. The rays of the scan cone are slightly bent or redirected, without application of optical power. The result is no change in focus of the beams passing through the optical device 700.

The infinite focus capability of the projection system is maintained due to the fact that the free-form major faces 701,702 correct for any astigmatic distortion of the beams that is introduced by the varied thickness 704 of the optical material. This varied thickness 704 is required to turn the beams, but the free-form surfaces are used to cancel the astigmatism on an angle-by-angle basis while allowing the whole beam to be steered by a given angle.

In the illustrative embodiment of FIG. 7, the optical device 700 includes features in addition to major faces 701,702 and optical material 703. For example, mounting features 706, 707,708 are included in the design to allow the optical device 700 to be attached to the housing of a projection system. These mounting features 706,707,708 are optional. Additionally, it will be clear to those of ordinary skill in the art having the benefit of this disclosure that the configuration of each of the mounting features 706,707,708 will change based upon the design of the housing.

In some embodiments, horizontal smile distortion, i.e., central pinching on the sides of the image, can be introduced when correcting vertical smile distortion. However, one advantage associated with using the optical device 700 shown in FIG. 7 with a scanning display is that the scanner and associated electronic video processing can be used to correct any horizontal smile distortion. Consequently, even if horizontal smile distortion is introduced, this effect can be negated by the scanner and video processing to yield a distortion-free image. Moreover, in one or more embodiments employing a scanner sweeping a raster pattern to form images, the video processing electronics and control circuitry operating the scanner are capable of correcting horizontal smile distortion without requiring any complex frame buffering and or remapping of the distortion.

Figure 8:
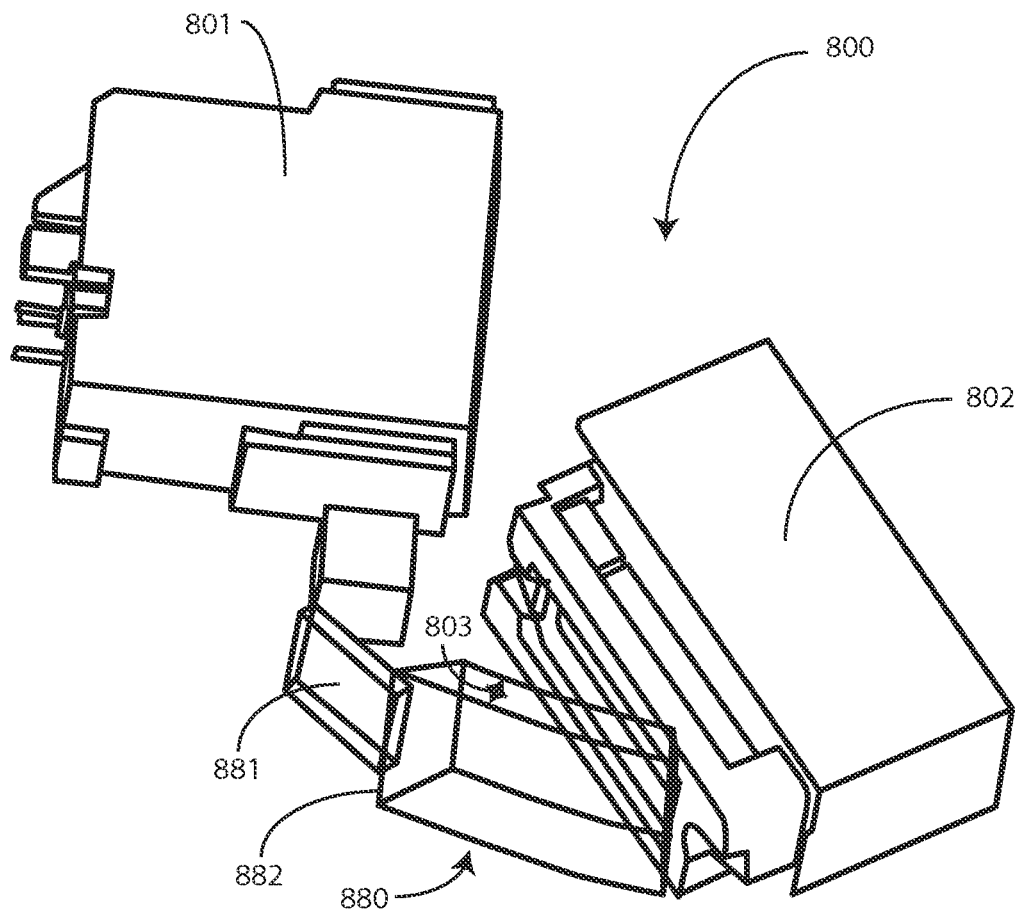
FIG. 8 illustrates one compact, horizontally fed, scanned laser projection system employing an optical device configured in accordance with one or more embodiments of the invention to correct distortion.
Figure 9:
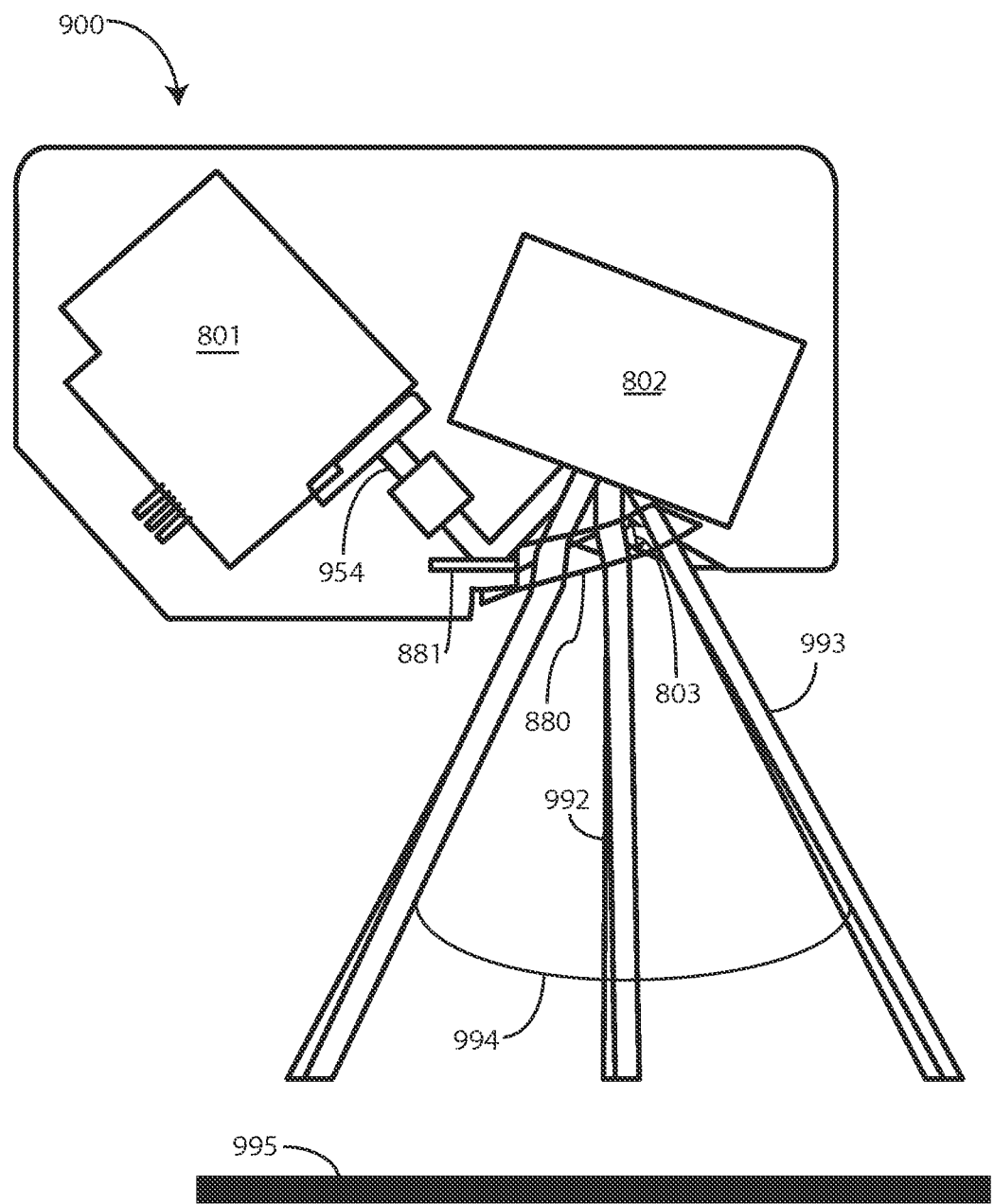
FIGS. 9-11 illustrate an optical device configured in accordance with one or more embodiments of the invention correcting distortion.

Turning now to FIGS. 8 and 9, illustrated therein are the elements of a projection system 900 using an optical device 880 or element configured in accordance with one or more embodiments of the invention. FIG. 8 illustrates a laser scanning engine 800 comprising a scanner 802 and a laser light source 801, while FIG. 9 shows the laser scanning engine 800 being disposed in a housing 990. The scanner 802 in this illustrative embodiment is a MEMS scanning device. As the scanner 802 and laser light source 801 are oriented horizontally, the scanner 802 is horizontally fed by the laser light source 801 as shown in FIG. 9. In this illustrative embodiment, the horizontal alignment leads to an angle of incidence between laser light source 801 and scanner 802 being greater than the design threshold. In this illustrative embodiment, the angle of incidence is about eighteen degrees. The projection system 900 is configured to scan one or more beams 991,992, 993 in a scan cone 994 to create an image 995. The scan cone 994 passes through the optical device 880, which is disposed at an output of the housing 990. As a MEMS scanning device is being used as the scanner 802, the projection system 900 inherently has a substantially infinite depth of focus.

In this illustrative embodiment, the optical device 880 has a mirror 881 integrated therewith. As shown in FIG. 9, this optional feature allows delivered light 954 to reflect off the mirror 881 to the scanner 802. It will be clear to those of ordinary skill in the art having the benefit of this disclosure that the mirror 881, where included, can be integrated into the optical device 880 in a variety of ways. In this illustrative embodiment, where the optical device 880 is manufactured from an isotropic material like glass or plastic, the mirror 881 can be formed as an extension from a first side 882 of the optical device 880.

As described above, the optical device 880 is configured to substantially correct both vertical smile distortion and anamorphic distortion present in the image 995. To this end, the optical device 880 redirects the principal beam 992 (as well as the other beams 991,993) by a predetermined amount determined by the varied thickness 803 of the optical device 880, and to correct astigmatic distortion introduced by the varied thickness 803 on an angle-by-angle basis across the scan cone 994. The astigmatic distortion correction works to preserve the infinite depth of focus of the scan cone 994. For example, in one embodiment, where the infinite depth of focus is over ten meters long, the depth of focus altered by less than 20 percent. Spot size, i.e., pixel size, is substantially unaffected as well, thereby preserving the resolution associated with such scanned laser projection systems.

Figure 10:
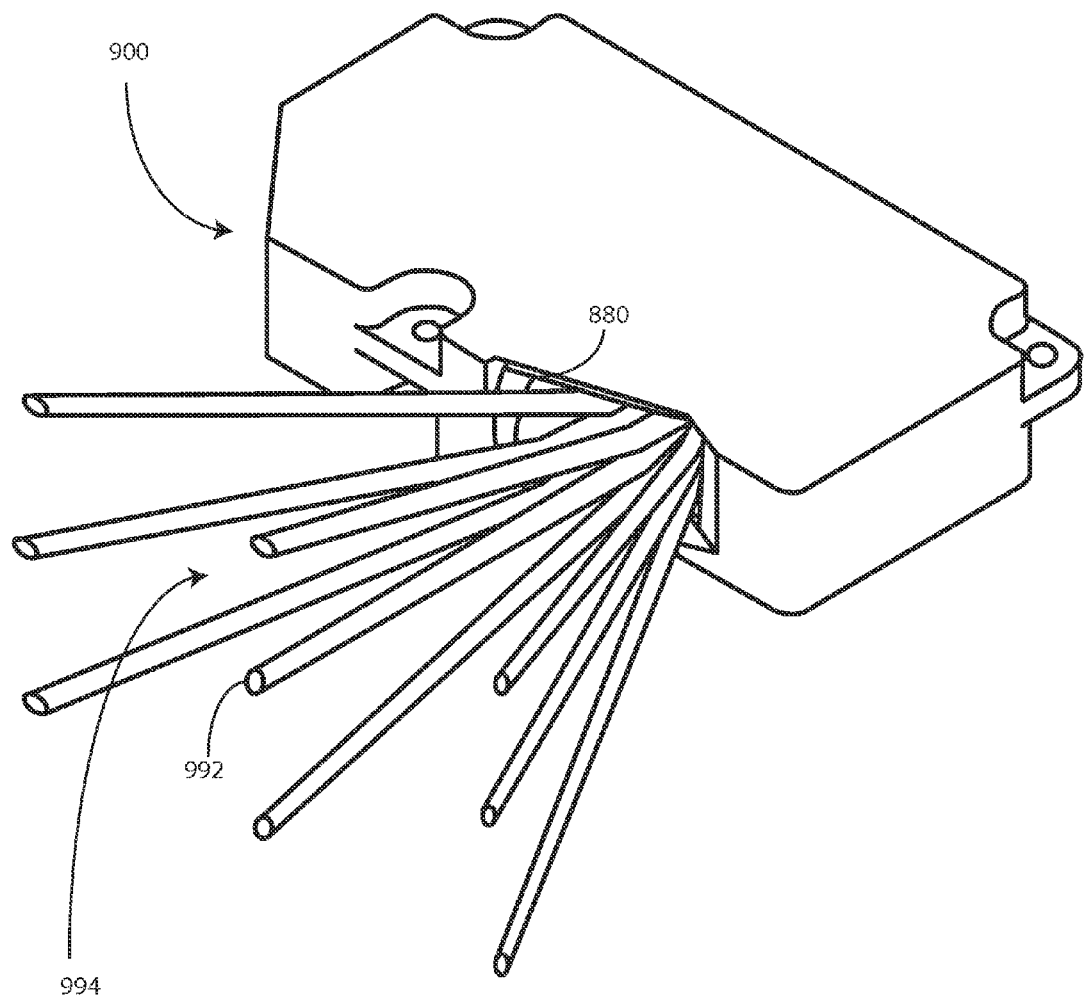

The optical device 880 substantially corrects vertical smile and anamorphic distortion. Accordingly, the scan cone 994 emitted from the projection system 900 is substantially realigned about the principal beam 992 when it exits the optical device 880, as shown in FIG. 10. The principal beam 992 defines the traveling direction of the scan cone 994 as described above.

Figure 11:
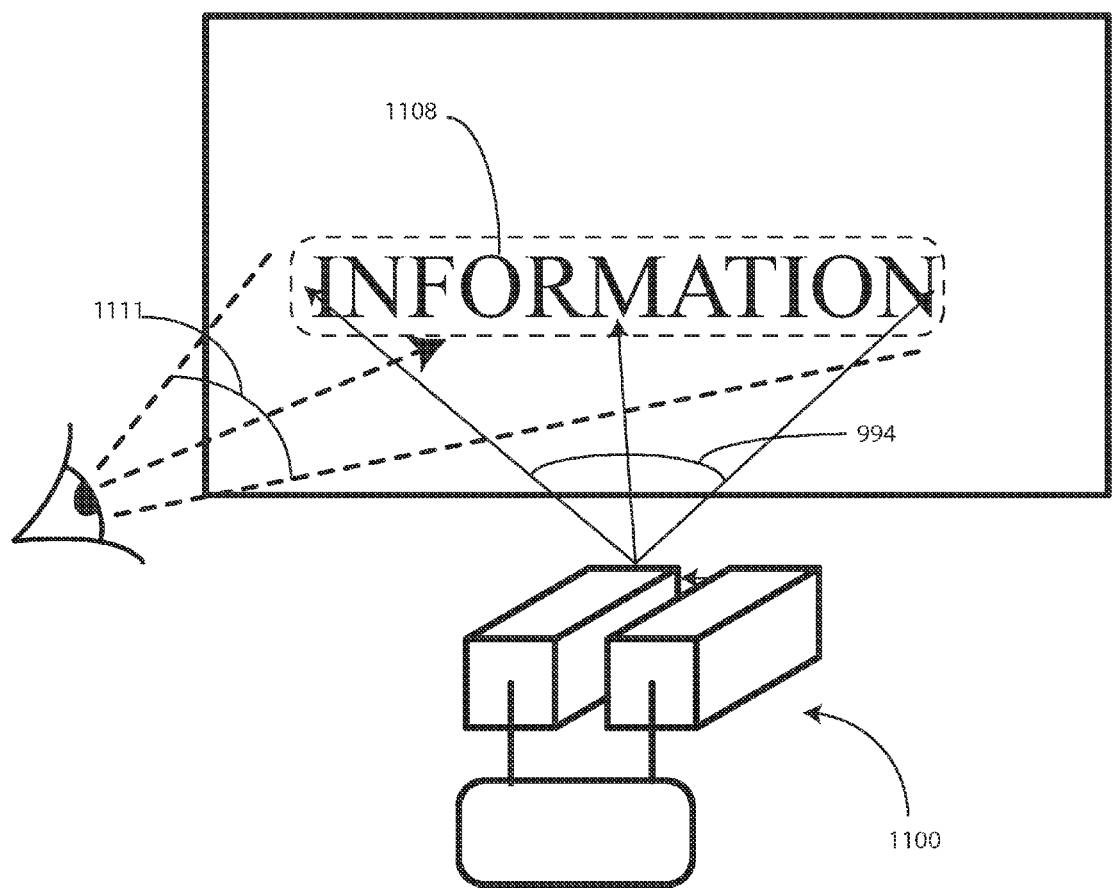

The result of using the optical device 880 of FIGS. 8-10 is shown in FIG. 11. In FIG. 11, the image 1108 being delivered from a horizontally fed MEMS scanning engine 1100 no longer suffers from any of keystone, vertical smile, or anamorphic distortion. Instead, the information 1108 is clear and easy to read. The field of view 1111 of the emitted scan cone 994 is substantially unaffected by the optical device (800).

In the foregoing specification, specific embodiments of the present invention have been described. However, one of ordinary skill in the art appreciates that various modifications and changes can be made without departing from the scope of the present invention as set forth in the claims below. Thus, while preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims.

What is claimed is:

1. A projection system, comprising:
   a housing;
   a projector configured to scan one or more beams in a scan cone to create an image having a substantially infinite depth of focus, wherein the projector includes a scanning engine to scan the one or more beams in two dimensions, and wherein an angle of incidence between the scanning engine and a feed beam is great enough to cause keystone distortion of the image, the projection engine being mounted to the housing with a rotation relative to the housing to correct for the keystone distortion, the rotation of the projection engine causing smile distortion and anamorphic distortion; and
   an optical device having major faces each defined by a polynomial that is a function of two independent, transverse variables, wherein the polynomials are selected to cause the optical device to reduce the smile distortion and anamorphic distortion of the image.

2. The projection system of claim 1, wherein an angle of incidence between the scanning engine and the feed beam is greater than about fourteen degrees.

3. The projection system of claim 1, wherein the major faces are separated by optical material having a decreasing thickness along at least one dimension of the optical device.

4. The projection system of claim 1, wherein the major faces comprise a convex face and a concave face, which are decentered relative to each other.

5. The projection system of claim 1, wherein each of the major faces is non-rotationally symmetric.

6. The projection system of claim 1, wherein each of the major faces is non-radially symmetric.

7. The projection system of claim 1, wherein the optical device is configured to alter a direction of a principal ray of the scan cone.

8. The projection system of claim 1, wherein the optical device comprises a mirror extending distally therefrom.

9. The projection system of claim 1, wherein the optical device comprises mounting features suitable for attachment of the optical device to the housing of the projection system.

* * * * *